United States Patent [19]

Hakanson et al.

[11] 3,944,367
[45] Mar. 16, 1976

[54] COPYBOARD COVER FOR A PHOTOGRAPHIC COPYING MACHINE

[75] Inventors: Nils L. Hakanson, West Springfield; Albert F. Touchette, Shutesbury, both of Mass.

[73] Assignee: Scott Paper Company, Philadelphia, Pa.

[22] Filed: Apr. 5, 1974

[21] Appl. No.: 458,314

[52] U.S. Cl. ................................. 355/76; 355/131
[51] Int. Cl.² ........................................ G03B 27/62
[58] Field of Search ............... 355/76, 75, 48–51, 355/72, 128–131, 118, 113, 116

[56] References Cited
UNITED STATES PATENTS

| | | | |
|---|---|---|---|
| 1,414,582 | 5/1922 | Roth | 355/128 |
| 1,417,403 | 5/1922 | Moninger | 355/116 |
| 3,183,805 | 5/1965 | Ritzerfeld et al. | 355/11 |
| 3,288,047 | 11/1966 | Limberger | 355/11 X |

*Primary Examiner*—L. T. Hix
*Assistant Examiner*—Kenneth C. Hutchison

[57] ABSTRACT

Disclosed is a copyboard cover for covering and holding in position documents placed upon a copyboard of a photographic copying machine. The copyboard cover in its preferred embodiment includes a frame, means for reciprocating the frame to and from a load position uncovering the copyboard for placement of a document on the copyboard and a copy position covering the document and the copyboard, a light-blocking cover material for covering the copyboard when the frame is in the copy position to block out undesirable light, a pressure plate mounted within the frame for holding the document flat against the copyboard, and means for reciprocating the pressure plate towards the copyboard in response to the frame moving into the copy position and from the copyboard in response to the frame beginning movement back to the load position. In the preferred form of the copyboard cover, the light-blocking cover material is provided by a flexible, wide belt which is moved over the document on the copyboard without relative movement between the document and the portion of the belt in contact with the document.

11 Claims, 3 Drawing Figures

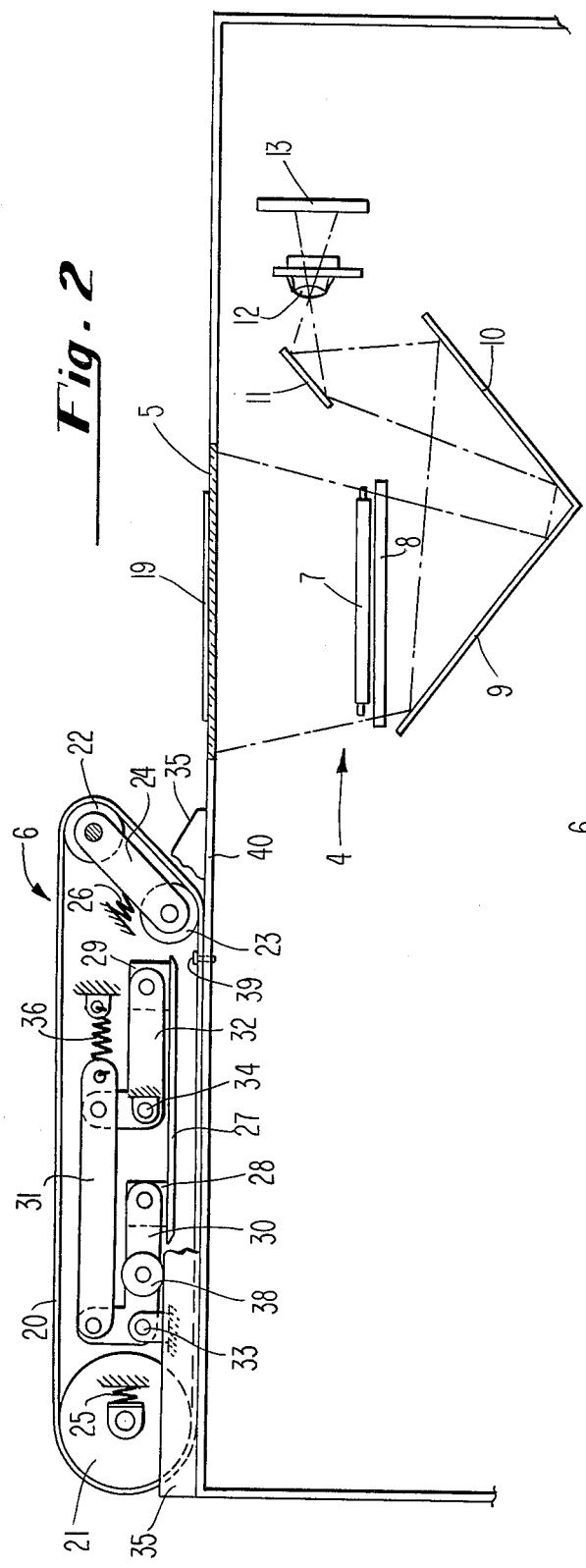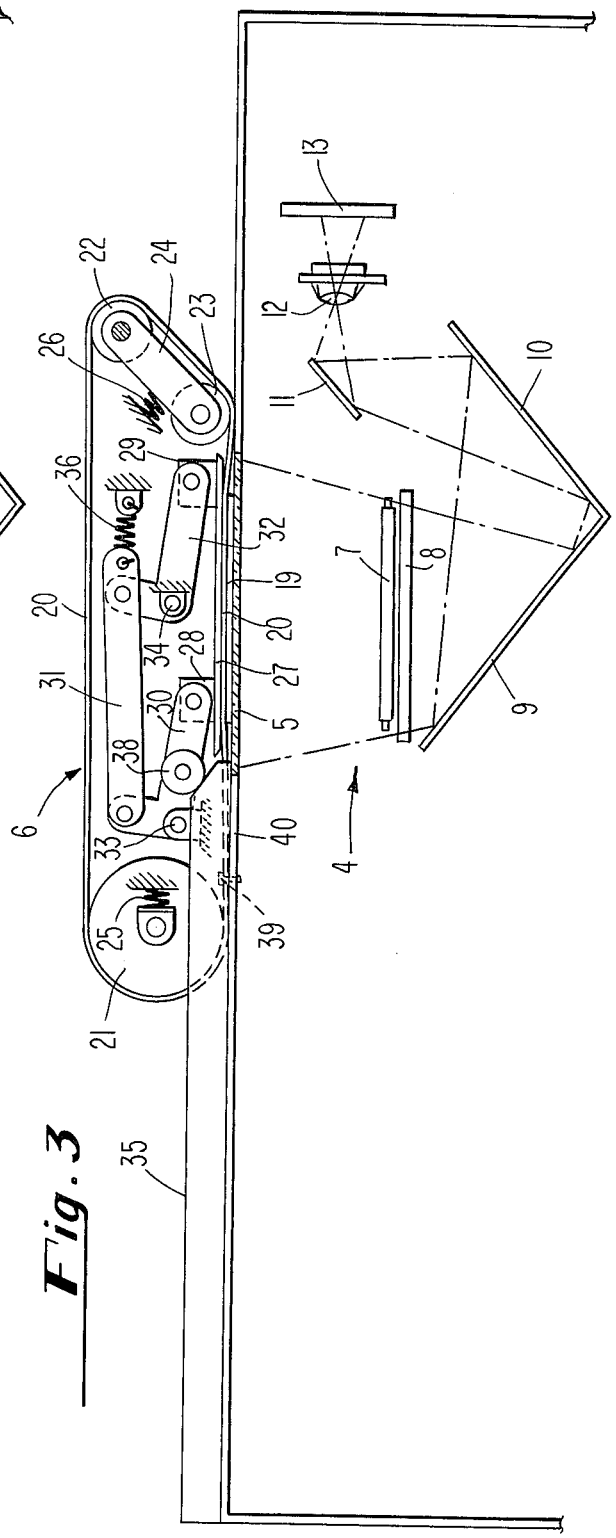

COPYBOARD COVER FOR A PHOTOGRAPHIC COPYING MACHINE

BACKGROUND OF THE INVENTION

1. Field of the Invention

The invention relates generally to photographic copying machines of the type where documents are placed upon a copyboard to be copied and specifically to a copyboard cover for covering the document and the copyboard.

2. Description of the Prior Art

In the type of photographic copying apparatus wherein a document is placed upon a copyboard and a light image is reflected from the document to a photosensitive film upon which a copy of the document is made, it is desirable to cover the document and copyboard with a copyboard cover during imaging, for several reasons. One reason is to prevent the operator from exposure to the very bright copying light. Another reason is to assure that the document is held flat against the copyboard to prevent distortion of the copied information. A third reason is to provide an attractive border region around documents not as large as the copyboard, through use of a white cover material on the copyboard cover.

Perhaps the simplest and most common form of copyboard cover is a flat sheet of white material, which is usually made of some flexible material such as rubber and has one end secured to the copying machine at one end of the copyboard. This simple type of cover is lifted and folded back by hand to permit placement of a document (and removal later) on the copyboard, and then placed back over the document on the copyboard for imaging. There are a number of disadvantages with this type of copyboard cover. For example, placement or removal of the cover requires the use of at least one hand of the operator, thus preventing him from performing other functions such as collecting copies coming from the machine or selecting additional documents to be placed on the copyboard next. Also, the operator might disturb the document's positioning on the copyboard when he places the cover over the document, because of the ability of the cover to move laterally with respect to the copyboard. Additionally, this type of cover does not always hold the document flat against the copyboard, particularly if the document is one which is not naturally flat. A further disadvantage is that lifting and handling of the copyboard cover by the operator eventually results in the cover becoming dirty, thus not only presenting an undesirable background for imaging, but often dirtying the documents being copied.

It is an object of the present invention to provide a copyboard cover which does not have the above-described disadvantages.

SUMMARY OF THE INVENTION

The copyboard cover of the invention includes a copyboard cover frame and means for reciprocating the frame to and from a rearward load position uncovering the copyboard for placement of a document on the copyboard and a forward copy position covering the document on the copyboard. The copyboard cover further includes a light-blocking cover material which blocks out undesirable light and can be moved over the document and copyboard without disturbing the placement of the document on the copyboard. A preferred embodiment of the invention includes a pressure plate for applying pressure against the document on the copyboard to hold the document flat against the copyboard. The pressure plate is mounted within the frame along with means for reciprocating the pressure plate towards the copyboard plane in response to the frame moving into the copy position and away from the copyboard plane in response to the frame beginning movement back to the load position. The pressure plate is mounted to the frame through linkage means which are arranged to maintain the pressure plate parallel to the copyboard while the pressure plate reciprocates.

In a preferred form of the invention the light-blocking cover material is provided by a flexible, wide belt which is connected to the frame through belt-restraining means for positioning a portion of the belt on a flat plane parallel to and against the copyboard when the frame is in the copy position. The beltrestraining means includes a roll rotatably mounted to the frame in a forward position. The belt is partially wrapped about the roll, and one end of the belt may be secured to the copying machine enclosure in a fixed position with respect to the copyboard to prevent relative movement between the document and the portion of the cover material in contact with the document. In another embodiment, the light-blocking cover material is provided by an endless, flexible, wide belt and the belt-restraining means is connected to the frame for holding the belt in an elongated loop having a flat lower portion parallel to the copyboard. The belt-restraining means permits rotation of the belt with respect to the frame, so that the cover material may be moved over the document on the copyboard without relative movement between the document and flat lower portion of the cover material which contacts the document.

In the preferred embodiment of the invention, the belt-restraining means are provided by a rear roll rotatably mounted in a rearward position on the frame and capable of rearward movement with respect to the frame, a forward fixed roll rotatably mounted in an upper forward fixed position on the frame, a forward float roll rotatably mounted in a lower forward position on the frame and capable of movement away from the plane of the copyboard to permit movement of the forward float roll over a thick document placed upon the copyboard. In this embodiment, the light-blocking material is looped over the three rolls and the pressure plate is mounted between the upper and lower portions of the looped cover material.

BRIEF DESCRIPTION OF THE DRAWINGS

FIG. 2 is a side elevation view of a preferred embodiment of the invention schematically illustrated with the copyboard cover in the load position and with portions broken away to illustrate the invention; and FIG. 3 is a side elevation view of a preferred embodiment of the invention schematically illustrated with the copyboard cover in the copy position and with portions broken away to illustrate the invention.

DESCRIPTION OF THE PREFERRED EMBODIMENTS

Figure 1:
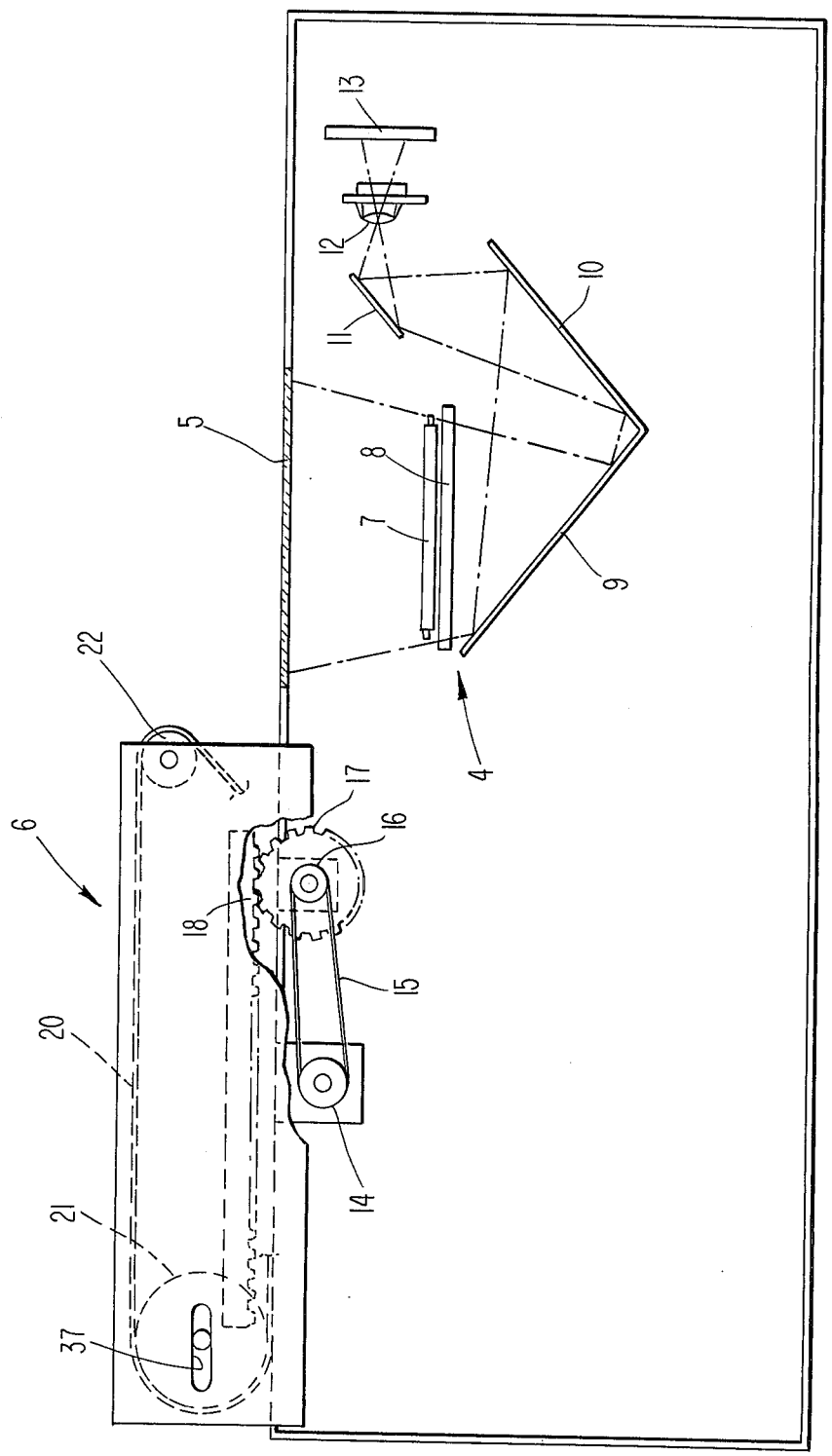
FIG. 1 is a side elevation view of a preferred embodiment of the invention schematically illustrated in place on a copying machine and with portions broken away to illustrate the drive mechanism of the copyboard cover.

The preferred embodiment of the copyboard cover of the inventionn is illustrated in FIG. 1, where copyboard cover 6 is positioned atop a photographic copying machine enclosure. The copying machine includes copyboard 5, which is made of transparent material such as glass and mounted on the top panel of the copying machine enclosure, and imaging assembly 4 disposed within the copying machine enclosure. Imaging assembly 4 includes lamp 7 and reflector 8 positioned beneath the copyboard 5, reflecting mirrors 9, 10 and 11 for directing the reflected light image of a document placed on the copyboard 5 through lens 12 and onto photographic film 13.

The copyboard cover 6 is mounted for reciprocating movement on the copying machine enclosure to and from a rearward load position (illustrated in FIGS. 1 and 2) exposing copyboard 5 and a forward copy position (illustrated in FIG. 3) covering the document on top of the copyboard. The copyboard cover 6 can be moved to and from the copy position and load position by any form of conventional means, including a hand operated arrangement, but preferably by the driving arrangement illustrated in FIG. 1. The driving arrangement includes reversible electric motor 14 driving rack 18 and pinion 17 through torque delivered to pinion shaft 16 by belt 15. Rack 18 is attached to the frame of copyboard cover 6, and motor 14 and pinion 17 are attached to the copying machine enclosure. Conventional limit switches are used to limit travel to the copyboard cover and reverse the travel direction.

FIGS. 2 and 3 are schematic views of the copyboard cover 6 (with the frame enclosure and drive mechanism removed) in the load position (FIG. 2) and the copy position (FIG. 3). The copyboard cover 6 includes endless, flexible belt 20 wrapped about rear roll 21, forward fixed roll 22, and forward float roll 23. Forward fixed roll 22 is rotatably mounted to the frame at a fixed position. Forward float roll 23 is rotatably mounted to member 24, which in turn is pivotably mounted to the shaft of fixed roll 22. Therefore, float roll 23 is free to swing upwardly when belt 20 is moved over a document 19 of substantial thickness. Compression spring 26 is mounted in a fixed position to the copyboard frame and biases float roll 23 downwardly toward the plane of the copyboard. Rear roll 21 is rotatably mounted in horizontal slot 37 (FIG. 1) and is rearwardly biased by compression spring 25 mounted in a fixed position to the copyboard cover frame. Thus, when float roll 23 swings upwardly and permits slack in the belt 20, rear roll 21 is urged backwardly to take up the slack.

Pressure plate 27 is mounted within the frame of the copyboard cover through a linkage arrangement which moves the pressure plate 27 downwardly when it is above document 19 (FIG. 3) to assure that the document 19 is pressed flat against the copyboard 5. The pressure plate linkage includes L-shaped members 30 and 32, which are pivotably mounted to the copyboard frame through shafts 33 and 34, respectively. The pressure plate 27 is rotatably connected to one end of each L-shaped members 30 and 32 by way of lugs 28 and 29. The opposite ends of the L-shaped members 30 and 32 are rotatably connected to horizontal member 31, which is biased in a forward direction by tension spring 36 fixed at one end to the frame. A cam follower 38 is rotatably mounted to the middle portion of L-shaped member 30 and operably engages cam track 35, which is attached to the copying machine enclosure. Cam track 35 is a flat horizontal surface except at the forwardmost end where it is inclined downwardly. When the copyboard cover 6 is advanced forward over the document 19, cam follower 38 is moved down the incline of cam track 35 by the urging of spring 36, pivoting L-shaped member 30 clockwise, translating horizontal member 31 to the right, and pivoting L-shaped member 32 clockwise to the same degree as L-shaped member 30 is pivoted. This motion of the linkage members results in pressure plate 27 being moved against the lower portion of belt 20 while being maintained parallel to the copyboard 5.

While only one set of linkage members 30, 31 and 32 is illustrated, it is preferable to have another set of linkage members, one set on each side of the pressure plate 27. Also, although only one member 24 connecting forward float roll 23 to forward fixed roll 22 is illustrated, two members 24 should be employed, one on each of rolls 22 and 23 and preferably interconnected to move together to prevent one end of forward float roll 23 from lifting farther away from the copyboard plane than the other end, which would result in unequal movement of the two sides of cover belt 20. While simple compression springs biasing float roll 23 towards the plane of the copyboard could be employed without use of the members 24, use of the members 24 are preferable to equalize movement of the cover material 20 on both sides.

The light-blocking cover material 20 can be provided by any form of flexible material, but is preferrably made from a white, washable material, which will present a clean white background for documents which do not cover the entire copyboard 5. The light-blocking cover material 20 is preferrably an endless, wide belt, a little wider than the copyboard 5, but belt 20 does not have to be endless. For example, in the preferred form of the invention, the belt 20 is fixedly secured by bolts 39 to the copying machine enclosure 40 at a point just to the left of forward float roll 23 in FIG. 2. Because the copyboard cover 6 preferrably reciprocates only a short distance, usually less than its length, the lower portion of the belt 20 just to the left of the forward float roll 23 when the frame is in the load position is not subjected to any relative movement with respect to the copying machine enclosure. Therefore, securing the belt 20 to the copying machine enclosure 40, by way of bolts 39 for example, not only does not interfere with the operation of the copyboard cover 6, but can be beneficial in maintaining the belt 20 in the proper lateral position on the rolls 21, 22 and 23. Also, the belt 20 does not necessarily have to be endless if one end is secured to the copying machine enclosure, such as just described. For example, the belt 20 could be discontinuous with each end fixed close together to the copying machine enclosure. Having the two ends of a discontinuous belt 20 fixed close together on the copying machine enclosure is the equivalent of an endless belt for purposes of this invention, and throughout the specification and claims the term endless belt shall also include this equivalent.

The primary function of the light-blocking cover material is to cover the document 19 on the copyboard 5 to prevent undesirable light from passing through the copyboard 5. Therefore, the light-blocking cover material does not have to be any longer than the length of the copyboard 5, although a length sufficient to form an endless belt 20, is beneficial for a particularly satisfactory copyboard cover. The invention could utilize a shorter belt secured at one end to the copying machine enclosure rearward of the copyboard, partially wrapping about a forward roll, and secured by a yielding arrangement, such as springs, to the frame. With this arrangement, the copyboard cover would require only one roll, which would be forwardly mounted on the frame.

Having described the preferred embodiments of the invention, its mode of operation will now be described. An operator places a document 19 to be copied upon copyboard 5 and presses a button to start the copying operation. Upon actuation of the electrical circuit, which can be provided by any form of electrical circuitry which will perform the following functions, the reversible electric motor 14 (FIG. 1) begins a clockwise rotation, driving pinion 17 through belt 15. Pinion 17 advances rack 18 and the copyboard cover frame forward. As the copyboard cover frame moves forward, the light-blocking cover material, in the form of an endless belt 20, is caused to rotate about rolls 21, 22 and 23, because belt 20 is either fixed to the copying machine enclosure or is held against relative movement with the copying machine enclosure through frictional forces. Therefore, belt 20 is "rolled" over the document 19 with no relative movement between the document and the part of belt 20 which contacts document 19 to avoid movement of the document 19 on the copyboard 5.

While the copyboard cover frame is moving toward the copy position (FIG. 3), the pressure plate 27 is maintained parallel to the copyboard plane and above the lower portion of the belt 20 until the copyboard cover frame moves into the copy position. As the copyboard cover frame moves into the copy position, the track cam 35, having a downwardly inclined portion at the forward end, permits the pressure plate 27 to be pressed against the lower portion of the belt 20, by way of spring-biased linkage members 30, 31 and 32. When the copyboard cover frame reaches the copy position, limit switches stop rotation of the electric motor 14 and forward movement of the copyboard cover frame and allow the copyboard cover to remain in the copy position while imaging takes place. After imaging, the electric motor 14 is reversed, driving the copyboard cover frame in a rearward direction. As the copyboard cover frame begins its movement in a rearward direction, the pressure plate 27 is lifted from belt 20 by operation of cam track 35 acting upon cam follower 38 and through linkage members 30, 31 and 32. Because this arrangement results in some slight rearward movement of the copyboard cover frame before the pressure plate 27 has lifted clear of the lower portion of the belt 20, it is preferable that the cover material 20 be made of a slippery material, such as Mylar, so that the pressure plate 27 can slide against the cover material while the cover material does not move with respect to the document 19.

Having described the preferred embodiments of the invention, it should be recognized that a number of variations can be employed within the scope of the invention. For example, the enclosure of the copyboard cover frame could serve as the light-blocking cover material if designed to form a light seal about the copyboard 5 With such an arrangement, the pressure plate 27 would perform the function of holding the document 19 flat against the copyboard 5. Other arrangements are also obvious to those skilled in the art.

What is claimed is:

1. In an apparatus for copying documents placed upon a copyboard, a copyboard cover comprising:
   a copyboard cover frame;
   means for reciprocating the frame to and from a rearward load position and a forward copy position;
   light-blocking cover material associated with the frame for covering the copyboard when the frame is in the copy position;
   a pressure plate mounted within the frame for applying pressure against the document on the copyboard to hold the document flat against the copyboard; and
   means for reciprocating the pressure plate towards the copyboard in response to the frame moving into the copy position and from the copyboard in response to the frame beginning movement back to the load position.

2. The copyboard cover according to claim 1, wherein the means for reciprocating the pressure plate comprises:
   linkage members arranged to maintain the pressure plate parallel to the copyboard while the pressure plate reciprocates;
   biasing means for urging the pressure plate towards the copyboard;
   a cam follower operably connected to the linkage means for reciprocation of the pressure plate;
   a cam operably engaging the cam follower and sloped toward the copyboard at the forward end to permit the pressure plate to move towards the copyboard as the frame moves into the copy position and to force the pressure plate away from the copyboard when the frame begins to move from the copy position.

3. The copyboard cover according to claim 2, wherein the lightblocking cover material is provided by a flexible planar material and is positioned between the copyboard and the pressure plate when the frame is in the copy position.

4. In an apparatus for copying documents placed upon a copyboard, a copyboard cover comprising:
   a copyboard cover frame;
   means for reciprocating the frame to and from a rearward load position and a forward copy position;
   a light-blocking cover material for covering the copyboard when the frame is in the copy position, the light-blocking cover material being provided by a flexible, wide belt; and
   belt-restraining means connected to the frame for positioning at least a portion of the belt in a flat plane parallel to and against the copyboard when the frame is in the copy position, the belt restraining means comprising a roll rotatably mounted to the frame in a forward position and about which the belt is partially wrapped for movement about the roll, and securing means for holding a portion of the belt in a fixed position with respect to the copyboard, whereby the cover material may be moved over the document on the copyboard without relative movement between the document and the portion of the cover material contacting the document, the roll being movable with respect to the frame away from the copyboard plane when the copyboard cover moves over a thick document placed on the copyboard, and the belt-restraining means further includes biasing means for urging the roll towards the copyboard plane.

5. The copyboard cover according to claim 4, further including first and second pivotable members mounted at the ends of the roll for permitting the roll to pivot away from the copyboard plane, the pivotable members being interconnected to cause both ends of the roll to move together away from the copyboard plane.

6. In an apparatus for copying documents placed upon a copyboard, a copyboard cover comprising:
a copyboard cover frame;
means for reciprocating the frame to and from a rearward load position and a forward copy position;
a light-blocking cover material for covering the copyboard when the frame is in the copy position, the light-blocking cover material being provided by an endless flexible wide belt; and
belt-restraining means connected to the frame for holding the belt in an elongated loop having a flat lower portion parallel to the copyboard, the belt restraining means permitting rotation of the belt with respect to the frame, whereby the cover material may be moved over the document on the copyboard without relative movement between the document and the flat lower portion of the cover material which contacts the document;
the belt-restraining means comprising a forwardly positioned roll and a rearwardly positioned roll, both rotatably mounted to the frame and about which the belt loops, the forwardly positioned roll being movable with respect to the frame away from the copyboard plane when the copyboard cover moves over a thick document placed on the copyboard, and the belt-restraining means further includes biasing means for urging the forwardly positioned roll towards the copyboard plane.

7. The copyboard cover according to claim 6, wherein the belt-restraining means comprises three rolls about which the belt is looped, the first and second rolls being rotatably mounted in a rearward position on the frame and a forward position on the frame, respectively, by means which permits movement of at least one of the first and second rolls in a direction outwardly from the frame, and the third roll being rotatably mounted in a forward lower position on the frame by means which permits movement of the third roll away from the copyboard plane, the belt-restraining means further including biasing means urging the third roll towards the copyboard plane and biasing means urging the movably mounted first or second roll in a direction outwardly from the frame.

8. The copyboard cover according to claim 6, further including a pressure plate for exerting pressure through the flat lower portion of the belt against the document, on the copyboard to hold the document flat against the copyboard, and including means for reciprocating the pressure plate towards the copyboard in response to the frame moving into the copy position and away from the copyboard in response to the frame beginning movement from the copy position towards the load postion.

9. In an apparatus for copying documents placed upon a copyboard, a copyboard cover comprising:
a copyboard cover frame;

means for reciprocating the frame to and from a rearward load position uncovering the copyboard for placement of a document on the copyboard and a forward copy position covering the document and the copyboard;
a rear roll rotatably mounted in a rearward position on the frame and capable of rearward movement with respect to the frame;
a forward fixed roll rotatably mounted in an upper forward fixed position on the frame;
a forward float roll rotatably mounted in a lower forward position on the frame and capable of movement away from the plane of the copyboard;
a light-blocking cover material in the form of an endless flexible wide belt looping over the rear roll, the forward fixed roll, and the forward float roll;
first biasing means for urging the forward float roll towards the copyboard;
second biasing means for urging the rear roll in a rearward direction;
a pressure plate mounted within the frame in a position between the upper and lower portions of the looped cover material, the pressure plate being maintained parallel to the plane of the copyboard and reciprocatable from a first position spaced from the lower portion of the cover material to a second position against the lower portion of the cover material to exert pressure through the cover material against the document on the copyboard; and
reciprocating means operably connected to the pressure plate for moving the pressure plate towards the copyboard in response to movement of the frame into the copy position and away from the copyboard in response to the frame beginning movement from the copy position towards the load position.

10. The copyboard cover according to claim 9, wherein the lower portion of the looped cover material is held in a fixed position with respect to the copyboard when the frame is moved to and from the copyboard.

11. In an apparatus for copying documents placed upon a copyboard, a copyboard cover comprising:
a copyboard cover frame;
means for reciprocating the frame to and from a rearward load position and a forward copy position;
a light-blocking cover material for covering the copyboard when the frame is in the copy position, the light-blocking cover material being provided by an endless flexible wide belt; and
belt-restraining means connected to the frame for holding the belt in an elongated loop having a flat lower portion parallel to the copyboard, the belt-restraining means permitting rotation of the belt with respect to the frame, whereby the cover material may be moved over the document on the copyboard without relative movement between the document and the flat lower portion of the cover material which contacts the document, the belt-restraining means comprising three rolls about which the belt is looped, the first and second rolls being rotatably mounted in a rearward position on the frame and a forward position on the frame, respectively, by means which permits movement of at least one of the first and second rolls in a direction outwardly from the frame, and the third roll being rotatably mounted in a forward lower position on the frame by means which permits movement of the third roll away from the copyboard plane, the belt-restraining means further including biasing means urging the third roll towards the copyboard plane and biasing means urging the movably mounted first or second roll in a direction outwardly from the frame.

* * * * *